(12) United States Patent
Fukuyama et al.

(10) Patent No.: US 12,140,564 B2
(45) Date of Patent: Nov. 12, 2024

(54) DEFECT DETECTION METHOD, DEFECT DETECTION DEVICE, AND ADDITIVE MANUFACTURING DEVICE

(71) Applicant: MITSUBISHI HEAVY INDUSTRIES, LTD., Tokyo (JP)

(72) Inventors: Misaki Fukuyama, Tokyo (JP); Nobuhiro Higuchi, Tokyo (JP); Natsuse Morimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 299 days.

(21) Appl. No.: 17/802,615

(22) PCT Filed: Feb. 16, 2021

(86) PCT No.: PCT/JP2021/005711
§ 371 (c)(1),
(2) Date: Aug. 26, 2022

(87) PCT Pub. No.: WO2021/182032
PCT Pub. Date: Sep. 16, 2021

(65) Prior Publication Data
US 2023/0135790 A1    May 4, 2023

(30) Foreign Application Priority Data
Mar. 13, 2020   (JP) .................................. 2020-043735

(51) Int. Cl.
*G01N 29/04*       (2006.01)
*B22F 10/85*       (2021.01)
(Continued)

(52) U.S. Cl.
CPC ........... *G01N 29/043* (2013.01); *B22F 10/85* (2021.01); *B22F 12/90* (2021.01); *B29C 64/268* (2017.08);
(Continued)

(58) Field of Classification Search
CPC .. G01N 29/043; G01N 29/12; G01N 29/2418; G01N 2291/014;
(Continued)

(56) References Cited

U.S. PATENT DOCUMENTS

2009/0139333 A1   6/2009  Hirose et al.
2017/0146489 A1   5/2017  Redding et al.
(Continued)

FOREIGN PATENT DOCUMENTS

CN      103543208 A  *  1/2014
JP      4-286933 A      10/1992
(Continued)

OTHER PUBLICATIONS

CN-103543208-A, English Translation (Year: 2014).*
(Continued)

*Primary Examiner* — Ryan D Walsh
(74) *Attorney, Agent, or Firm* — Birch, Stewart, Kolasch & Birch, LLP

(57) ABSTRACT

A defect detection method includes: a step of irradiating an object with a pulsed laser beam to continuously generate ultrasonic waves in the object; and a step of detecting the presence or absence of an internal defect of the object on the basis of the presence or absence of resonance of the ultrasonic waves occurring between a surface of the object and the internal defect. In this method, the internal defect is detected on the basis of the presence or absence of resonance of the ultrasonic waves occurring between the surface of the object and the internal defect. The internal defect can be thus detected even when the internal defect is in a surface layer of the object. The detected internal defect is crack or void.

16 Claims, 8 Drawing Sheets

(51) Int. Cl.
  *B22F 12/90*   (2021.01)
  *B29C 64/268*  (2017.01)
  *B29C 64/393*  (2017.01)
  *B33Y 40/00*   (2020.01)
  *B33Y 50/02*   (2015.01)
  *G01N 29/12*   (2006.01)
  *G01N 29/24*   (2006.01)

(52) U.S. Cl.
  CPC ............ *B29C 64/393* (2017.08); *B33Y 40/00* (2014.12); *B33Y 50/02* (2014.12); *G01N 29/12* (2013.01); *G01N 29/2418* (2013.01); *G01N 2291/014* (2013.01); *G01N 2291/0289* (2013.01)

(58) Field of Classification Search
  CPC . G01N 2291/0289; B22F 10/85; B22F 12/90; B29C 64/268; B29C 64/393; B33Y 40/00; B33Y 50/02
  See application file for complete search history.

(56) References Cited

U.S. PATENT DOCUMENTS

| | | |
|---|---|---|
| 2017/0234812 A1 | 8/2017 | Abbott et al. |
| 2017/0266727 A1 | 9/2017 | Nishino et al. |
| 2017/0312821 A1 | 11/2017 | Defelice et al. |
| 2018/0292355 A1* | 10/2018 | Gold .................. G05B 19/4099 |
| 2019/0070663 A1 | 3/2019 | Corsmeier |
| 2019/0204275 A1 | 7/2019 | Hatahori et al. |
| 2020/0223146 A1 | 7/2020 | Totzeck et al. |

FOREIGN PATENT DOCUMENTS

| | | | |
|---|---|---|---|
| JP | 4-323553 A | | 11/1992 |
| JP | 2009-536319 A | | 10/2009 |
| JP | 2011-257163 A | | 12/2011 |
| JP | 2012-163406 A | | 8/2012 |
| JP | 2015081858 A | * | 4/2015 |
| JP | 2016-60063 A | | 4/2016 |
| JP | 2017-96936 A | | 6/2017 |
| JP | 2017-101963 A | | 6/2017 |
| JP | 2017-144482 A | | 8/2017 |
| JP | 2017-207478 A | | 11/2017 |
| JP | 2019-73796 A | | 5/2019 |
| JP | 2019-196973 A | | 11/2019 |
| WO | WO 2006/054330 A1 | | 5/2006 |
| WO | WO 2007/128138 A1 | | 11/2007 |
| WO | WO 2017/221324 A1 | | 12/2017 |
| WO | WO 2018/234331 A1 | | 12/2018 |
| WO | WO-2022239338 A1 | * | 11/2022 |
| WO | WO-2022254805 A1 | * | 12/2022 |

OTHER PUBLICATIONS

JP-2015081858-A, English Translation (Year: 2015).*
WO-2022239338-A1, English Translation (Year: 2022).*
WO-2022254805-A1, English Translation (Year: 2022).*
International Preliminary Report on Patentability and Written Opinion of the International Searching Authority for International Application No. PCT/JP2021/005711, dated Sep. 22, 2022, with an English translation.
International Search Report and Written Opinion of the International Searching Authority for International Application No. PCT/JP2021/005711, dated Apr. 27, 2021.
Japanese Office Action for Japanese Application No. 2020-043735, dated Nov. 21, 2023, with English translation.
Japanese Office Action for Japanese Application No. 2020-043735, dated Feb. 6, 2024, with English translation.

* cited by examiner

DEFECT DETECTION METHOD, DEFECT DETECTION DEVICE, AND ADDITIVE MANUFACTURING DEVICE

TECHNICAL FIELD

The present disclosure relates to a defect detection method, a defect detection device, and an additive manufacturing device.

BACKGROUND

In recent years, with the aim of improving performance with complex structures, attention has been focused on additive manufacturing (AM) technology, and equipment for producing a three-dimensional object (3D printed product) by additive manufacturing using electron beam or laser beam has become widespread. For example, Patent Document 1 discloses a device that monitors the temperature of a growing part and adjusts a beam output to be emitted on the basis of the temperature in additive manufacturing.

CITATION LIST

Patent Literature

Patent Document 1: JP2019-73796A

SUMMARY

Problems to be Solved

Conventional cast and forged products are subject to inspections at each stage of production process, such as inspections for each part and inspections after assembly, to ensure quality. In contrast, 3D printed products formed by additive manufacturing technology yield no intermediate products due to the integrated forming at once using metal powder as a material, and all parts have to be inspected in the final shape.

However, when the above inspection method is applied to 3D printed products formed by additive manufacturing after production, it may not be possible to contact a sensor due to the complexity of the final shape. If products are large, X-rays do not penetrate sufficiently, making it difficult to apply X-ray CT or the like. Further, 3D printing takes several tens of hours of stacking time to completion, but there is no criterion for stopping the printing even if an internal defect is generated during the printing. If the presence of an internal defect is detected in quality inspections such as X-ray inspections after printing, significant rework can occur. To reduce the risk of rework, it is important to be able to detect an internal defect even during printing. Patent Document 1 does not disclose any measure for solving the problems of internal defect.

Laser ultrasonic method is known as a method for detecting an internal defect in a non-contact manner. In the laser ultrasonic method, the surface of an object to be inspected is heated locally by irradiating the surface of the object with a pulsed laser beam to generate ultrasonic waves through thermal expansion or ablation, and the generated ultrasonic waves propagate inside the object, are reflected or scattered by an internal defect, and propagate back to the surface, where they are measured by a detection device such as a laser interferometer.

In defect detection by the laser ultrasonic method, it is necessary to observe reflected waves from the defect when irradiated with a pulsed laser beam. However, when inspecting a defect at a shallow depth (near the surface), the reflected waves from the defect are buried in the surface vibration displacement caused by the incident waves. Therefore, it is difficult to apply this method to the detection of a defect located shallow from the surface occurring during 3D printing.

In view of the above, an object of the present disclosure is to provide a defect detection method, a defect detection device, and an additive manufacturing device suitable for detecting an internal defect of a 3D printed object.

Solution to the Problems

A defect detection method according to the present disclosure includes: a step of irradiating an object with a pulsed laser beam to continuously generate ultrasonic waves in the object; and a step of detecting the presence or absence of an internal defect of the object on the basis of the presence or absence of resonance of the ultrasonic waves occurring between a surface of the object and the internal defect.

A defect detection device according to the present disclosure includes: a pulsed laser irradiation device configured to irradiate an object with a pulsed laser beam to continuously generate ultrasonic waves in the object; and a detection device configured to detect vibration on a surface of the object based on the ultrasonic waves, detect the presence or absence of resonance of the ultrasonic waves, and detect the presence or absence of an internal defect of the object on the basis of the presence or absence of the resonance of the ultrasonic waves occurring between the surface of the object and the internal defect.

An additive manufacturing device according to the present disclosure includes: a beam irradiation device for 3D printing an object; and the above-described defect detection device.

Advantageous Effects

The present disclosure provides a defect detection method, a defect detection device, and an additive manufacturing device suitable for detecting an internal defect of a 3D printed object.

DETAILED DESCRIPTION

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Additive Manufacturing Device Equipped with Defect Detection Device)

Figure 1:
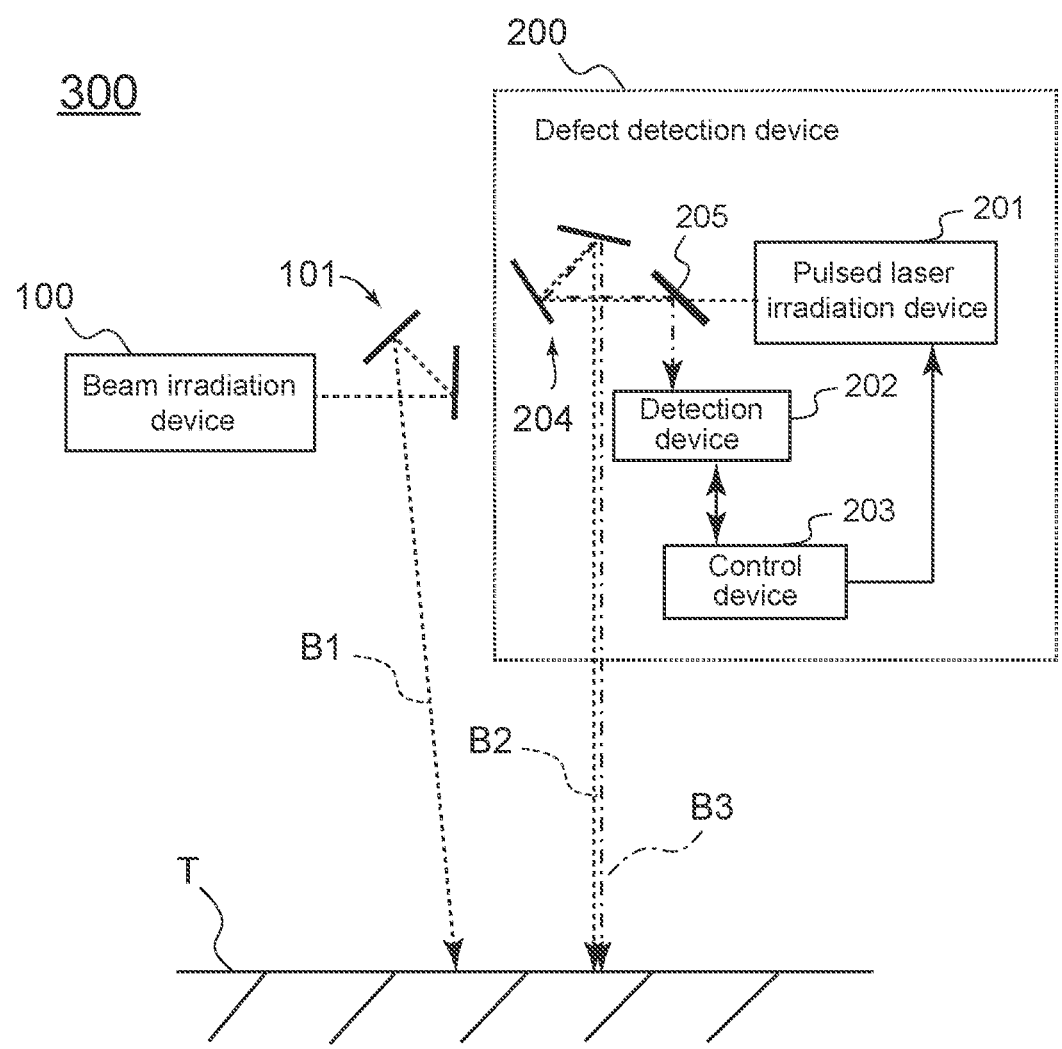
FIG. 1 is a schematic configuration diagram of an additive manufacturing device according to an embodiment.

An additive manufacturing device 300 according to an embodiment will now be described. FIG. 1 is a schematic configuration diagram of an additive manufacturing device 300 according to an embodiment. In FIG. 1, optical systems such as collimating lenses and condenser lenses are omitted. In the following description, the additive manufacturing device 300 equipped with a defect detection device 200 will be described, but the defect detection device 200 may be independent of the additive manufacturing device 300.

As shown in FIG. 1, the additive manufacturing device 300 includes a beam irradiation device 100 for 3D printing an object T, and a defect detection device 200 for detecting an internal defect. The additive manufacturing device 300 is, for example, a device that performs powder bed additive manufacturing (AM). The additive manufacturing device 300 may be a device that performs laser metal deposition (LMD) manufacturing.

The beam irradiation device 100 is configured to irradiate a raw material powder (e.g., alloy powder) spread as a powder bed with an energy beam B1 along any CAD-based shape. Thereby, the beam irradiation device 100 melts and solidifies the raw material powder to 3D print the object T. The beam irradiation device 100 is a device that emits a laser beam for processing as the energy beam B1. The additive manufacturing device 300 may further include a galvano mirror 101. In this case, the galvano mirror 101 can change the direction of the energy beam B1 to scan over the powder bed.

The beam irradiation device 100 is not limited to the above configuration. For example, the beam irradiation device 100 may be a device that emits an electron beam as the energy beam B1. The additive manufacturing device 300 may not include the galvano mirror 101. For example, the additive manufacturing device 300 may be configured to move or rotate the beam irradiation device 100 itself to scan the energy beam B1.

The defect detection device 200 includes a pulsed laser irradiation device 201 configured to irradiate the object T with a pulsed laser beam B2, a detection device 202 configured to detect the presence or absence of an internal defect of the object T, and a control device 203 configured to control them. The pulsed laser irradiation device 201 irradiates the object T with the pulsed laser beam B2 to continuously generate ultrasonic waves in the object T. The ultrasonic waves are, for example, burst waves of 20 MHz or 30 MHz. This frequency is the same as the frequency in repetition (repetition frequency) of pulses of the pulsed laser beam B2. The "pulsed laser" includes a laser that periodically changes the output of a continuously oscillating laser. The pulsed laser irradiation device 201 preferably emits the pulsed laser beam B2 from directly above to increase the intensity of reflected waves. In the case of the powder bed additive manufacturing, it is preferable to emit the pulsed laser beam B2 to an exposed portion of the object T not covered with the powder.

The detection device 202 is configured to detect vibration on the surface of the object T based on the ultrasonic waves to detect the presence or absence of resonance of the ultrasonic waves. Further, the detection device 202 is configured to detect the presence or absence of an internal defect of the object T on the basis of the presence or absence of resonance of the ultrasonic waves occurring between the surface of the object T and the internal defect. The internal defect is a processing defect such as cracks and voids.

The detection device 202 may include, for example, a laser interferometer. In this case, the detection device 202 is configured to emit a laser beam B3 to the object T, receive its reflected beam, and measure the displacement, i.e., vibration of the surface of the object T.

The laser beam B3 is preferably a laser beam having a wavelength different from that of the pulsed laser beam B2. For example, when the pulsed laser beam B2 has an infrared wavelength while the laser beam B3 has a visible light wavelength, even if both beams overlap, it is easy to separate them in detection. A laser doppler may be provided as a configuration including the laser interferometer.

The defect detection device 200 may further include a galvano mirror 204. In this case, the galvano mirror 204 can change the direction of the pulsed laser beam B2 or the laser beam B3 to scan over the powder bed.

The defect detection device 200 may further include a half mirror 205. In this case, as shown in FIG. 1, the pulsed laser beam B2 and the laser beam B3 may be incident on the galvano mirror 204 via the half mirror 205 to change the directions of the pulsed laser beam B2 and the laser beam B3. Such a configuration is suitable for emitting the laser beam B3 in the same position as the pulsed laser beam B2.

The defect detection device 200 may not include the galvano mirror 204. For example, the defect detection device 200 may be configured to move or rotate the pulsed laser irradiation device 201 itself or the detection device 202 itself to scan the pulsed laser beam B2 or the laser beam B3.

Further, the defect detection device 200 may not include the half mirror 205. For example, the defect detection device 200 may include a beam splitter instead of the half mirror 205. The defect detection device 200 may not include the half mirror 205 and the beam splitter, and may be configured to independently scan the pulsed laser beam B2 and the laser beam B3.

The control device 203 includes, for example, a central processing unit (CPU), a random access memory (RAM), and a read only memory (ROM). The control device 203 controls the operation of the entire device by executing a program stored in the ROM or RAM, for example. Further, the control device 203 stores various data (for example, design information of the object T, information related to detection signal, reference signal, and setting of repetition frequency) described later in the ROM or RAM.

The control device 203 may be integrally formed with the pulsed laser irradiation device 201 or the detection device 202. Further, the control device 203 may be configured to control the galvano mirror 204. The defect detection device 200 may not include the control device 203. For example, instead of the automatic control by the control device 203, the user may manually operate the device.

(Defect Detection Method)

The defect detection method according to some embodiments will now be described. The defect detection method described below may be automatically executed by the control process of the control device 203, or some procedures may be executed manually by the user instead of the control device 203. The defect detection method according to an embodiment is applied to, for example, powder bed additive manufacturing (AM). However, the defect detection method can also be applied to an object formed by another method such as the LMD method.

Figure 2:
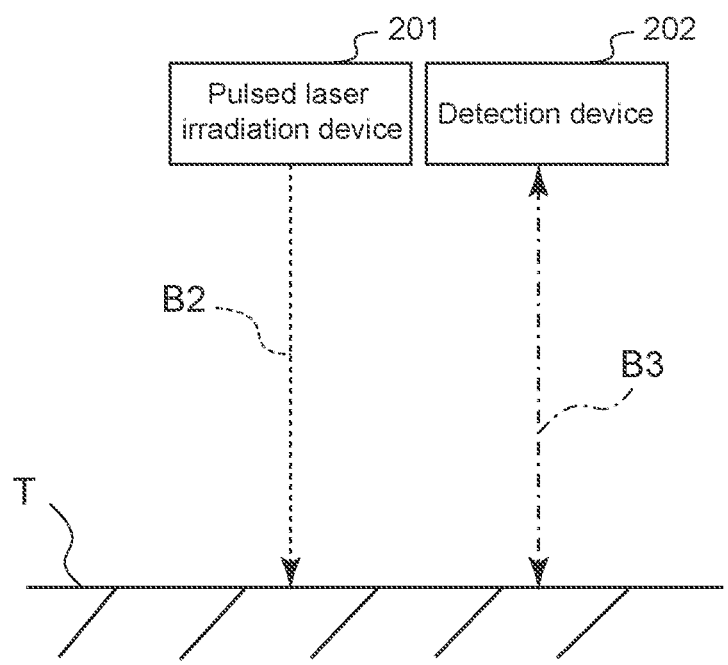
FIG. 2 is a diagram for describing the principle of the defect detection method according to an embodiment.
Figure 3:
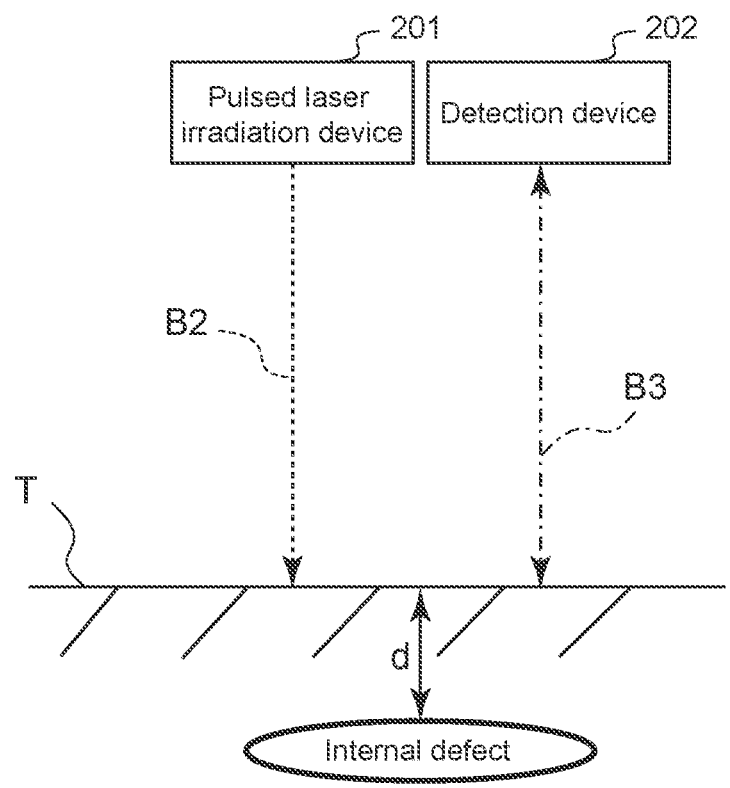
FIG. 3 is a diagram for describing the principle of the defect detection method according to an embodiment.
Figure 4:
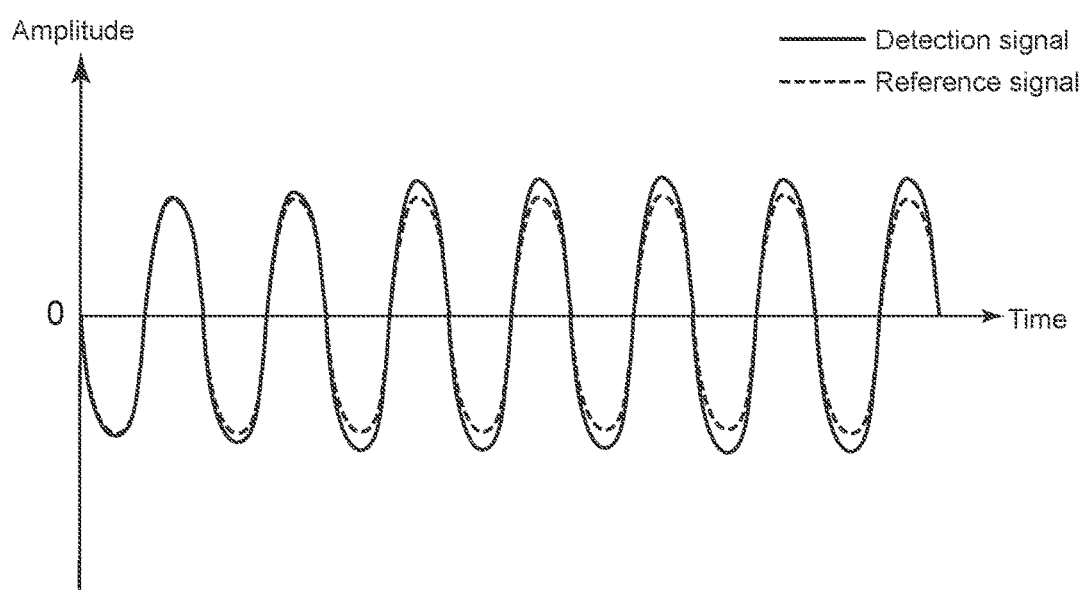
FIG. 4 is a diagram for describing the principle of the defect detection method according to an embodiment.
Figure 5:
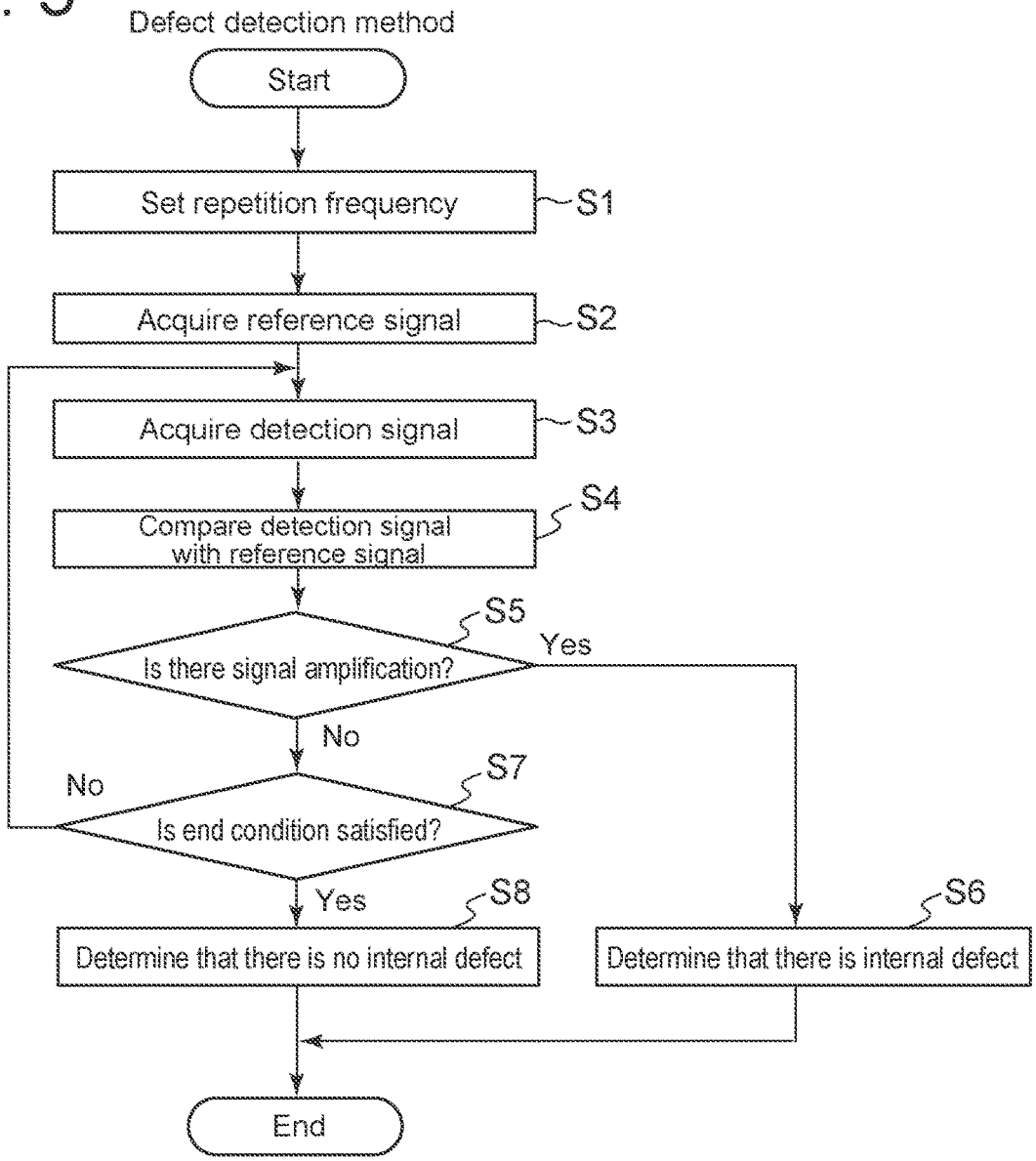
FIG. 5 is a flowchart of procedure of the defect detection method according to an embodiment.

FIG. 2 is a diagram for describing the principle of the defect detection method according to an embodiment. FIG. 3 is a diagram for describing the principle of the defect detection method according to an embodiment. FIG. 4 is a diagram for describing the principle of the defect detection method according to an embodiment. FIG. 5 is a flowchart of procedure of the defect detection method according to an embodiment.

Here, a defect detection method suitable for detection of defect with a fixed detection depth will be described. For example, the depth at which it is unclear whether an internal defect occurs but an internal defect is likely to occur, such as an adhesive interface between different materials, can be inferred from design information. In such a case, as will be described later, the defect detection may be performed by setting the detection depth to a depth at which an internal defect is likely to occur.

As shown in FIG. 5, in the defect detection method according to an embodiment, the repetition frequency of the pulsed laser beam B2 is set (step S1). This setting may be performed by the user based on the knowledge, or may be performed by the control device 203 based on the design information.

Specifically, the repetition frequency of the pulsed laser beam B2 is set so as to correspond to a frequency with a half wavelength equal to the depth from the surface of the object T to an internal defect to be detected (detection depth at which an internal defect may occur). For example, the repetition frequency may be set so as to correspond to a frequency with a half wavelength equal to the distance d to the position of the internal defect shown in FIG. 3. The expression "so as to correspond" means that setting to that frequency, or setting to a frequency that takes into account measurement errors.

Here, the resonance, which is a condition for detecting an internal defect, occurs when the depth to the internal defect is an integral multiple of the half wavelength of the repetition frequency of the pulsed laser beam B2. In view of this, the repetition frequency may be set based on an integral multiple of the half wavelength instead of the half wavelength. However, when detecting a small internal defect in the surface layer, it is suitable in terms of accuracy to measure at a repetition frequency with a half wavelength corresponding to the distance of the internal defect, as described above.

Then, a reference signal indicating vibration of the surface of the object T obtained when the pulsed laser beam B2 is emitted to a position where no internal defect is estimated to be present directly below is acquired (step S2). Specifically, as shown in FIG. 2, the object T is irradiated with the pulsed laser beam B2 to continuously generate ultrasonic waves in the object T. The vibration of the surface of the object T based on the ultrasonic waves is measured by the detection device 202. Thus, the reference signal can be acquired. The laser beam B3 is used for the measurement. It is preferable that the pulsed laser beam B2 and the laser beam B3 are emitted in the same position or neighbor positions.

Then, a detection signal of vibration of the surface of the object is acquired (step S3). Specifically, the object T is irradiated with the pulsed laser beam B2 in a position to be detected whether an internal defect is present directly below (a position where an internal defect is likely to be present) to continuously generate ultrasonic waves in the object T. The vibration of the surface of the object T based on the ultrasonic waves is measured by the detection device 202. Thus, the detection signal can be acquired. The method for acquiring the reference signal and the method for acquiring the detection signal are essentially the same, only the position is different.

Then, the reference signal obtained in step S2 and the detection signal obtained in step S3 are compared (step S4). For example, as shown in FIG. 4, the waveform indicating the reference signal (waveform shown by the dashed line) and the waveform indicating the detection signal (waveform shown by the solid line) are compared. Since the reference signal and the detection signal are used at the stage of comparison, the order of steps S2 and S3 may be reversed.

It is determined whether there is signal amplification in comparison between the reference signal and the detection signal (step S5). When resonance occurs between the internal defect and the surface, the vibration of the surface of the object T caused by the ultrasonic waves becomes larger than when the resonance does not occur. Therefore, for example, if the amplitude of the detection signal is larger than the amplitude of the reference signal, there is a high possibility of resonance. The amplitude of the detection signal and the amplitude of the reference signal may be interpreted as the amplitude of vibration.

However, it is possible that a slight difference between the two is a detection error. Therefore, for example, it may be determined that there is signal amplification if the amplitude of the detection signal is larger than the amplitude of the reference signal by a predetermined amount or a predetermined ratio or more. For example, the predetermined amount may be set to 0.1 with the amplitude value of the reference signal being 1. For example, the predetermined ratio may be set to 10% of the reference signal. These discrimination criteria are merely illustrative and can be modified as appropriate.

If it is determined that there is signal amplification (step S5; Yes), it is presumed that there is resonance of the ultrasonic waves, so it is determined that there is an internal defect (step S6). Conversely, if it is determined that there is no signal amplification (step S5; No), it is determined whether an end condition is satisfied (step S7).

The end condition is, for example, whether defect detection has been performed over the range to be detected (for example, the entire area of the layer). If it is determined that the end condition is satisfied (step S7; Yes), it is presumed that there is no resonance of the ultrasonic waves, so it is determined that there is no internal defect (step S8). Conversely, if it is determined that the end condition is not satisfied (step S7; No), the process returns to step S3 with irradiation positions of the pulsed laser beam B2 and the laser beam B3 displaced.

In the example shown in FIG. 5, once it is determined that there is an internal defect (step S6), the process is immediately terminated. Therefore, the process ends when the first internal defect is found. However, the defect detection method is not limited thereto. For example, the process may end after the presence or absence of an internal defect is detected over the range to be detected. Further, in the example shown in FIG. 5, when it is determined that there is no internal defect (step S8), the process is immediately terminated. Therefore, if defect detection has been completed for the range to be detected, the process ends. However, the defect detection method is not limited thereto. For example, the process may wait until the next layer is formed by printing, and after the next layer is formed, the process may return to step S3 to restart the same process as described above for the new layer.

As described above, in the defect detection method according to an embodiment, the presence or absence of an internal defect is detected according to the comparison result in step S5. Further, in the defect detection method according to an embodiment, an internal defect is detected on the basis of the presence or absence of resonance of the ultrasonic waves occurring between the surface of the object T and the internal defect. With this method, the plane position of the internal defect can be acquired on the basis of the irradiation position of the pulsed laser beam B2 when the resonance occurs. The depth position of the internal defect can also be calculated from the set value of the repetition frequency although it is known. Therefore, when it is determined that there is an internal defect, the position of the internal defect can also be acquired.

Figure 6:
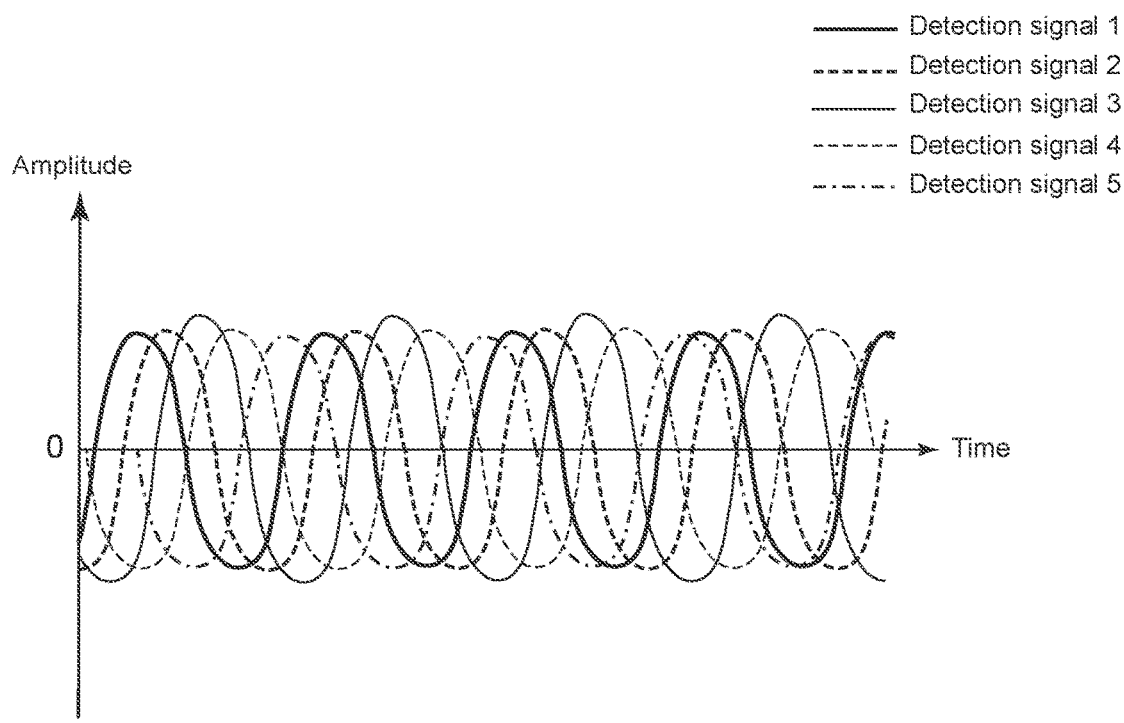
FIG. 6 is a diagram for describing the principle of the defect detection method according to an embodiment.
Figure 7:
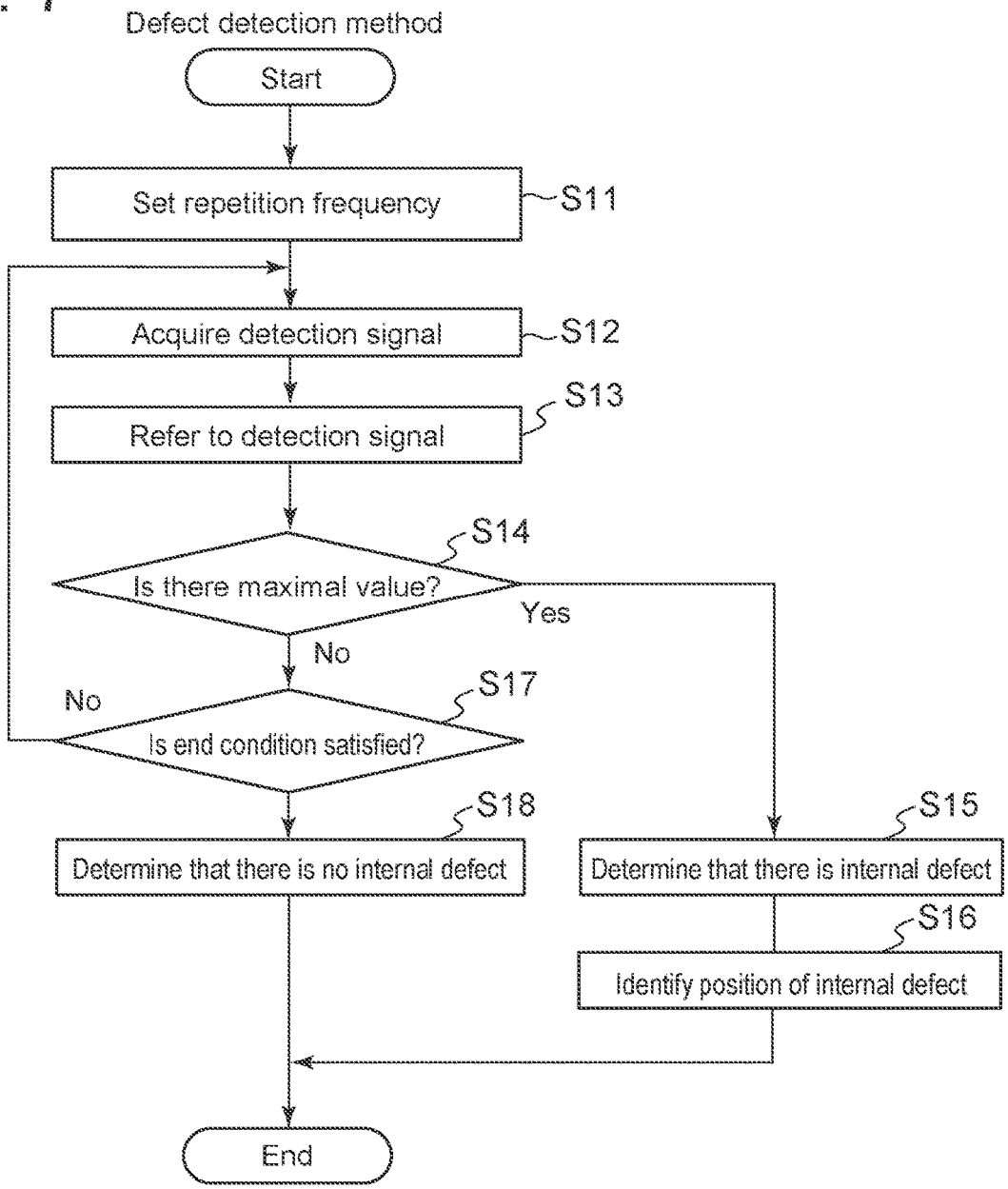
FIG. 7 is a flowchart of procedure of the defect detection method according to an embodiment.

Next, the defect detection method suitable for identifying the depth position of the internal defect will be described with reference to FIGS. 6 and 7. FIG. 6 is a diagram for describing the principle of the defect detection method according to an embodiment. FIG. 7 is a flowchart of procedure of the defect detection method according to an embodiment.

As shown in FIG. 7, in the defect detection method according to an embodiment, the repetition frequency of the pulsed laser beam B2 is set (step S11). The repetition frequency set at this point means an initial value of frequency sweep.

The repetition frequency may be set within a frequency range having a wavelength equal to or less than a half wavelength corresponding to the depth range to be detected of the object T. This is because the defect detection method according to an embodiment performs frequency sweep within such a range. Thus, waste in setting the repetition frequency can be reduced.

The "depth range to be detected" is the range from the surface to a predetermined depth and may be interpreted as the thickness of the surface layer, including one or more layers from the surface. The expression "corresponding" means that the length may be increased or decreased from the thickness of the surface layer, taking into account measurement errors. This setting method for the repetition frequency may be applied in step S1 shown in FIG. 5 or in step S22 shown in FIG. 8, which will be described later.

A detection signal of vibration of the surface of the object T is acquired while sweeping the repetition frequency of the pulsed laser beam B2 (step S12). The detection signal may be one piece of signal data when the repetition frequency is changed continuously, or may be a plurality of pieces of signal data for each change process when the repetition frequency is changed discretely. For example, in the example shown in FIG. 6, multiple detection signals (detection signals 1 to 5) obtained when the repetition frequency is changed by a predetermined amount are superimposed.

Here, the detection signal obtained in step S12 is referred to (step S13). Further, it is determined whether the amplitude indicated by the referred detection signal has a maximal value corresponding to the change in repetition frequency (step S14).

For example, in FIG. 6, the detection signals 1 to 5 indicate the detection signals in the order of changing the repetition frequency. Of these signals, the detection signal 3 in the process of change has a larger amplitude than the preceding and following detection signals 1, 2, 4, and 5. In this case, the amplitude indicated by the detection signal 3 has a maximal value corresponding to the change in repetition frequency. In the amplitude comparison, it may be determined whether the amplitude is maximal on the basis of whether there is an increase of a predetermined amount or more or a predetermined ratio or more with respect to the amplitudes of the preceding and following repetition frequencies. The predetermined amount and the predetermined ratio may be considered in the same manner as those described in step S5 of FIG. 5.

If it is determined that there is a maximal value (step S14; Yes), it is presumed that there is resonance of the ultrasonic waves, so it is determined that there is an internal defect (step S15). In this case, the position of the internal defect is identified (step S16). Specifically, the depth position of the internal defect is identified on the basis of the repetition frequency corresponding to the maximal value, and the plane position of the internal defect is identified on the basis of the irradiation position of the pulsed laser beam B2.

Conversely, if it is determined that there is no maximal value (step S14; No), it is determined whether an end condition is satisfied (step S17). The end condition is, for example, whether defect detection has been performed over the range to be detected (for example, the entire area of the layer). If it is determined that the end condition is satisfied (step S17; Yes), it is presumed that there is no resonance of the ultrasonic waves, so it is determined that there is no internal defect (step S18). Conversely, if it is determined that the end condition is not satisfied (step S17; No), the process returns to step S12 with irradiation positions of the pulsed laser beam B2 and the laser beam B3 displaced.

In the example shown in FIG. 7, the process ends when the first internal defect is found. However, for example, the process may end after the presence or absence of an internal defect is detected over the range to be detected. Further, in the example shown in FIG. 7, if defect detection has been completed for the range to be detected, the process ends. However, for example, the process may wait until the next layer is formed by printing, and after the next layer is formed, the process may return to step S12 to restart the same process as described above for the new layer.

Thus, in this method, the presence or absence of an internal defect is detected on the basis of whether the amplitude indicated by the detection signal has a maximal value corresponding to the change in repetition frequency. In this case, the presence or absence of an internal defect can be detected by utilizing the tendency that the vibration amplitude increases at a frequency at which resonance occurs. Additionally, the depth position of the internal defect can be identified on the basis of the repetition frequency with the maximal value. The position of the internal defect can be identified from the irradiation position of the pulsed laser beam B2 and the identified depth position.

Figure 8:
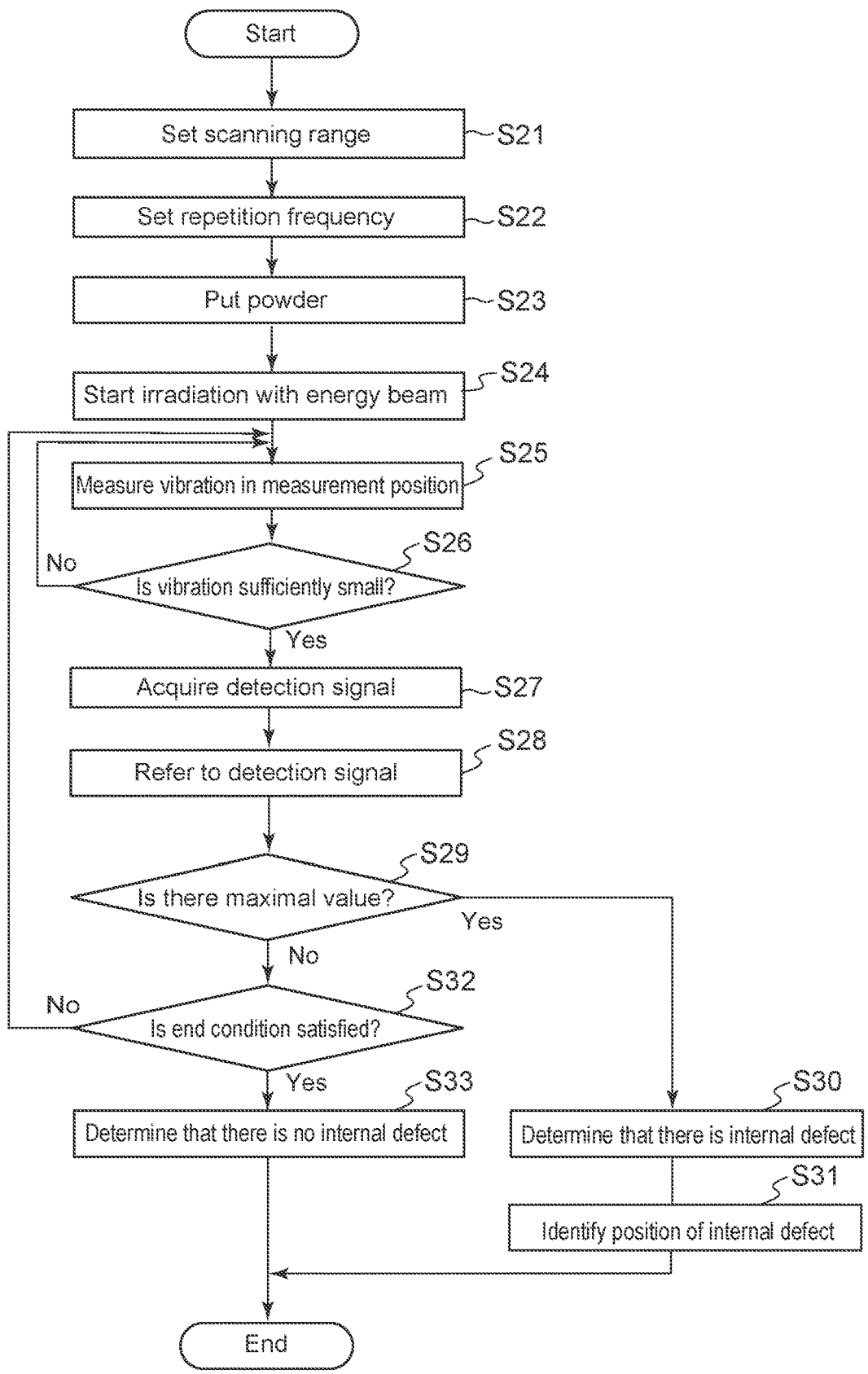
FIG. 8 is a flowchart of procedure of the defect detection method according to an embodiment.

Next, the defect detection method suitable for detecting the presence or absence of an internal defect during 3D printing will be described with reference to FIG. 8. FIG. 8 is a flowchart of procedure of the defect detection method according to an embodiment.

As shown in FIG. 8, in the defect detection method according to an embodiment, the scanning range is set (step S21). The repetition frequency of the pulsed laser beam B2 is set (step S22). The repetition frequency set at this point means an initial value of frequency sweep.

The additive manufacturing device 300 puts powder as a raw material of the object T (step S23). The additive manufacturing device 300 starts irradiation with the energy beam B1 (step S24). Thereafter, the additive manufacturing device 300 scans the energy beam B1 according to design information.

The vibration in the measurement position where the internal defect should be detected is measured (step S25). It is preferable to select a position not being irradiated with the energy beam B1 as the measurement position. In this case, since the presence or absence of an internal defect can be detected without influence of vibration or heat during processing, the detection accuracy is improved. To detect the vibration, a laser interferometer or a laser doppler vibrometer for detecting the presence or absence of resonance, which is provided in the detection device 202, may be used.

Then, in order to determine whether the detection is under influence of processing, it is determined whether the measured vibration is sufficiently small (step S26). For example, in this determination, whether the vibration in the object T is equal to or less than a reference value may be used as the determination criterion. The reference value may be set to, for example, a vibration displacement of 5% of the amplitude of the vibration caused by the pulsed laser beam B2.

If it is determined that the vibration is not sufficiently small (step S26; No), the procedure returns to step S25. At this time, a waiting time may be provided before returning to step S25. Conversely, if it is determined that the vibration is sufficiently small (step S26; Yes), the detection signal is acquired (step S27).

As described above, in the defect detection method according to an embodiment, ultrasonic waves may be generated when the vibration is equal to or less than a reference value. Further, in the defect detection method according to an embodiment, the presence or absence of an internal defect may be detected after waiting until the vibration becomes equal to or less than the reference value. Thus, the detection error can be reduced. The method for acquiring the detection signal in step S27 is basically the same as in step S12 described above. That is, the detection signal is acquired while sweeping the repetition frequency.

Here, the detection signal obtained in step S27 is referred to (step S28). Further, it is determined whether the amplitude indicated by the referred detection signal has a maximal value corresponding to the change in repetition frequency (step S29). The method for determining the presence or absence of the maximal value is basically the same as in step S14 described above.

If it is determined that there is a maximal value (step S29; Yes), it is presumed that there is resonance of the ultrasonic waves, so it is determined that there is an internal defect (step S30). In this case, the position of the internal defect is identified (step S31). The method for identifying the position of the internal defect is basically the same as in step S16 described above.

Conversely, if it is determined that there is no maximal value (step S29; No), it is determined whether an end condition is satisfied (step S32). The end condition is, for example, whether defect detection has been performed over the range to be detected (for example, the entire area of the layer). If it is determined that the end condition is satisfied (step S32; Yes), it is presumed that there is no resonance of the ultrasonic waves, so it is determined that there is no internal defect (step S33). Conversely, if it is determined that the end condition is not satisfied (step S32; No), the process returns to step S25 with irradiation positions of the pulsed laser beam B2 and the laser beam B3 displaced.

In the example shown in FIG. 8, the process ends when the first internal defect is found. However, for example, the process may end after the presence or absence of an internal defect is detected over the range to be detected. Further, in the example shown in FIG. 8, if defect detection has been completed for the range to be detected, the process ends. However, for example, the process may wait until the next layer is formed by printing, and after the next layer is formed, the process may return to step S25 to restart the same process as described above for the new layer.

In some embodiments, the internal defect may be detected by scanning the pulsed laser beam B2 so as to follow the trajectory of the energy beam B1 when 3D printing is performed by additive manufacturing. For example, the irradiation position of the pulsed laser beam B2 may be controlled to lag behind and follow the irradiation position of the energy beam B1. However, the scanning speed of the energy beam B1 depending on the processing time may be faster than the scanning speed of the pulsed laser beam B2 depending on the detection time of the internal defect. In other words, the pulsed laser beam B2 does not have to be scanned at the same scanning speed as the energy beam B1.

The scanning of the energy beam B1 may be made to wait until the defect detection with the pulsed laser beam B2 is completed, or the scanning speed may be slowed down. With such control, even though the printing time is extended, the time loss may be reduced rather than having to make large rework due to an internal defect that is found after 3D printing. The specific tracking control method can be appropriately modified according to the time required to detect an internal defect.

In some embodiments, the presence or absence of an internal defect may be detected on the object T in the process of 3D printing by additive manufacturing. In the case of 3D printing by additive manufacturing, even if a defect occurs during the process of 3D printing, the defect may not be found until quality inspection is performed after 3D printing. If the internal defect is found after 3D printing, there is a risk that a large rework will occur. In this regard, with the above method, since the internal defect is detected in the process of 3D printing, such a risk can be reduced.

In some embodiments, an internal defect in a surface layer within 200 μm from the surface of the object T may be detected. It is advantageous in detecting such an internal defect because it may be possible to deal with the defect only by repairing the surface layer.

In some embodiments, if an internal defect is detected on the object T in the process of 3D printing by additive manufacturing, a next layer and a layer immediately below the next layer may be melt so as to repair the internal defect when forming the next layer immediately above the internal defect. The expression "melting a next layer and a layer immediately below the next layer" means melting the layer containing the internal defect together with the upper layer above the internal defect.

For example, in a position where such melting is performed, the raw material powder may be supplied in a larger amount than usual to perform melting intensively (by increasing the heating time or heating temperature) to repair the internal defect. For example, such a process may be performed after step S6, S16, or S31. For example, an internal defect having a diameter of 500 µm or less is likely to be crushed by such remelting.

In some embodiments, the presence or absence of an internal defect on the object T may be detected each time a plurality of layers corresponding to the depth range to be detected in the object T are stacked when 3D printing is performed by additive manufacturing. The "plurality of layers" is set to any number, for example, five layers. The number of layers may be changed to a smaller number than usual (e.g., one layer) near the completion of printing to allow for more focused inspections. In other words, such a defect detection method does not necessarily need to detect an internal defect in each layer during the stacking process.

The present disclosure is not limited to the embodiments described above, but includes modifications to the embodiments described above, and embodiments composed of combinations of those embodiments.

Conclusion

The contents described in the above embodiments would be understood as follows, for instance.

(1) A defect detection method according to an embodiment of the present disclosure includes: a step of irradiating an object (T) with a pulsed laser beam (B2) to continuously generate ultrasonic waves in the object (T); and a step of detecting the presence or absence of an internal defect of the object (T) on the basis of the presence or absence of resonance of the ultrasonic waves occurring between a surface of the object (T) and the internal defect.

With the above method (1), an internal defect is detected on the basis of the presence or absence of resonance of the ultrasonic waves occurring between the surface of the object (T) and the internal defect. Thus, even when an internal defect is located in a surface layer of the object (T), the internal defect can be detected. Further, the use of the pulsed laser beam (B2) allows ultrasonic waves to be generated with a smaller spot diameter compared to the method of generating ultrasonic waves in an object with a probe. As a result, an internal defect can be detected regardless of whether the measurement plane viewed from the irradiation direction is a point, line, or plane. Therefore, it is suitable for detecting an internal defect in the 3D printed object (T).

(2) In some embodiments, in the above method (1), the method includes a step of detecting vibration on the surface of the object (T) based on the ultrasonic waves by a laser interferometer or a laser doppler vibrometer to detect the presence or absence of resonance of the ultrasonic waves.

With the above method (2), since ultrasonic waves are generated with the pulsed laser beam (B2), and vibration based on the ultrasonic waves is detected by the laser interferometer or the laser doppler vibrometer, the presence or absence of an internal defect can be detected in a non-contact manner.

(3) In some embodiments, in the above method (2), the step of detecting the presence or absence of the resonance includes irradiating the object (T) with a laser beam (B3) of the laser interferometer in the same position as irradiated with the pulsed laser beam (B2).

With the above method (3), since the presence or absence of the resonance is detected by irradiating the same position with the laser beam (B3) as irradiated with the pulsed laser beam (B2), the accuracy can be improved as compared to the case where the two irradiation positions are displaced for measurement.

(4) In some embodiments, in any one of the above methods (1) to (3), the presence or absence of the internal defect is detected on the object (T) in the process of 3D printing by additive manufacturing.

With the above method (4), since the internal defect is detected in the process of 3D printing, the risk of large rework can be reduced.

(5) In some embodiments, in any one of the above methods (1) to (4), the internal defect in a surface layer within 200 µm from the surface of the object (T) is detected.

With the above method (5), the internal defect in the surface layer within 200 µm from the surface is detected. It is advantageous in detecting such an internal defect because it may be possible to deal with the defect only by repairing the surface layer.

(6) In some embodiments, in any one of the above methods (1) to (5), the method includes a step of, if the internal defect is detected on the object (T) in the process of 3D printing by additive manufacturing, melting a next layer and a layer immediately below the next layer so as to repair the internal defect when forming the next layer immediately above the internal defect.

It is difficult to repair an internal defect located deep from the surface. In this regard, with the above method (6), the internal defect is repaired when forming the next layer; i.e., the repair is performed before the internal defect is away from the surface with the progress of stacking. Thus, the defect can be appropriately repaired.

(7) In some embodiments, in any one of the above methods (1) to (6), the method includes a step of, if the internal defect is detected, identifying the depth position of the internal defect on the basis of the repetition frequency of the pulsed laser beam (B2) when the resonance occurs.

With the above method (7), the depth position of the internal defect can be identified. The position of the internal defect can be identified from the irradiation position of the pulsed laser beam (B2) and the identified depth position.

(8) In some embodiments, in any one of the above methods (1) to (7), the method includes a step of setting the repetition frequency of the pulsed laser beam (B2) so as to correspond to a frequency with a half wavelength equal to the depth from the surface of the object (T) to the internal defect to be detected.

The resonance occurs when the depth to the internal defect is an integral multiple of the half wavelength of the repetition frequency of the pulsed laser beam (B2). However, when detecting a small internal defect in the surface layer, it is suitable in terms of accuracy to measure at a repetition frequency with a half wavelength corresponding to the distance of the internal defect. In this regard, the above method (8) is suitable for detecting a small internal defect in the layer surface since the repetition frequency of the pulsed laser beam (B2) is set to such a frequency.

(9) In some embodiments, in any one of the above methods (1) to (8), the method includes: a step of acquiring a detection signal of vibration on the surface of the object (T); a step of comparing the detection signal with a reference signal indicating vibration on the surface of the object (T) obtained when the pulsed laser beam (B2) is applied in a position where it is presumed that there is no internal defect; and a step of detecting the presence or absence of the internal defect according to a comparison result of the comparison step.

The above method (9) is suitable for detecting a defect with a fixed detection depth. For example, the depth at which it is unclear whether an internal defect occurs but an internal defect is likely to occur, such as an adhesive interface between different materials, can be inferred from design information. In such a case, the above method can be applied by setting the detection depth to a depth at which an internal defect is likely to occur.

(10) In some embodiments, in any one of the above methods (1) to (9), the method includes: a step of acquiring a detection signal of vibration on the surface of the object (T) while sweeping the repetition frequency of the pulsed laser beam (B2); and a step of detecting the presence or absence of the internal defect on the basis of whether an amplitude indicated by the detection signal has a maximal value depending on a change in the repetition frequency.

With the above method (10), the presence or absence of an internal defect is detected on the basis of whether the amplitude indicated by the detection signal has a maximal value corresponding to the change in repetition frequency. In this case, the presence or absence of an internal defect can be detected by utilizing the tendency that the vibration amplitude increases at a frequency at which resonance occurs.

(11) In some embodiments, in the above method (10), the method includes a step of identifying the depth position of the internal defect on the basis of the repetition frequency corresponding to the maximal value.

With the above method (11), the depth position of the internal defect can be identified on the basis of the repetition frequency corresponding to the maximal value indicating a high possibility of resonance.

(12) In some embodiments, in any one of the above methods (1) to (11), the method includes a step of setting the repetition frequency of the pulsed laser beam (B2) within a frequency range having a wavelength equal to or less than a half wavelength corresponding to a depth range to be detected in the object (T).

With the above method (12), since the repetition frequency of the pulsed laser beam (B2) is set within a frequency range corresponding to the depth range to be detected in the object (T) for which the presence or absence of an internal defect is detected, waste in setting the repetition frequency can be reduced.

(13) In some embodiments, in any one of the above methods (1) to (12), the method includes a step of irradiating the object (T) with an energy beam (B1) for 3D printing; and a step of detecting the presence or absence of the internal defect on the object (T) in a position not being irradiated with the energy beam (B1).

With the above method (13), since the presence or absence of an internal defect can be detected without influence of processing, the detection accuracy is improved.

(14) In some embodiments, in any one of the above methods (1) to (13), the method includes a step of detecting the presence or absence of the internal defect on the object (T) each time a plurality of layers corresponding to a depth range to be detected in the object (T) are stacked when 3D printing is performed by additive manufacturing.

With the above method (14), the presence or absence of an internal defect can be detected at an appropriate timing in the process of 3D printing. Further, since the detection is not performed for each layer in printing, the detection time can be shortened.

(15) In some embodiments, in any one of the above methods (1) to (14), the step of generating the ultrasonic waves is performed when vibration of the object (T) is equal to or less than a reference value.

When performing defect detection, vibration during processing of 3D printing or vibration due to other factors may occur. Such vibration increases the detection error of internal defect. In this regard, with the above method (14), since the detection of internal defect is performed after vibration subsides, the detection error can be reduced.

(16) In some embodiments, in any one of the above methods (1) to (15), the internal defect is detected by scanning the pulsed laser beam (B2) so as to follow the trajectory of an energy beam (B1) when 3D printing is performed by additive manufacturing.

With the above method (16), the presence or absence of an internal defect can be detected during 3D printing.

(17) A defect detection device according to an embodiment of the present disclosure includes: a pulsed laser irradiation device (201) configured to irradiate an object (T) with a pulsed laser beam (B2) to continuously generate ultrasonic waves in the object (T); and a detection device (202) configured to detect vibration on a surface of the object (T) based on the ultrasonic waves, detect the presence or absence of resonance of the ultrasonic waves, and detect the presence or absence of an internal defect of the object (T) on the basis of the presence or absence of the resonance of the ultrasonic waves occurring between the surface of the object (T) and the internal defect.

With the above configuration (17), an internal defect is detected on the basis of the presence or absence of resonance of the ultrasonic waves occurring between the surface of the object (T) and the internal defect. Thus, even when an internal defect is located in a surface layer of the object (T), the internal defect can be detected. Further, the use of the pulsed laser beam (B2) allows ultrasonic waves to be generated with a smaller spot diameter compared to the method of generating ultrasonic waves in an object with a probe. As a result, an internal defect can be detected regardless of whether the measurement plane viewed from the irradiation direction is a point, line, or plane. Therefore, it is suitable for detecting an internal defect in the object (T) 3D printed.

(18) An additive manufacturing device (300) according to an embodiment of the present disclosure includes: a beam irradiation device (100) for 3D printing an object (T); and the defect detection device (200) described in the above (17).

With the above configuration (18), the object (T) can be 3D printed while detecting the presence or absence of an internal defect.

REFERENCE SIGNS LIST

100 Beam irradiation device
101, 204 Galvano mirror
200 Defect detection device
201 Pulsed laser irradiation device
202 Detection device
203 Control device
205 Half mirror
300 Additive manufacturing device
B1 Energy beam
B2 Pulsed laser beam
B3 Laser beam
T Object

The invention claimed is:

1. A defect detection method, comprising:
a step of irradiating an object with a pulsed laser beam to continuously generate ultrasonic waves in the object;
a step of detecting presence or absence of an internal defect of the object on the basis of presence or absence of resonance of the ultrasonic waves occurring between a surface of the object and the internal defect;
a step of, if the internal defect is detected, identifying a depth position of the internal defect on the basis of a repetition frequency of the pulsed laser beam when the resonance occurs; and further comprising a step of setting the repetition frequency of the pulsed laser beam so as to correspond to a frequency with a half wavelength equal to a depth from the surface of the object to the internal defect to be detected.

2. The defect detection method according to claim 1, comprising a step of detecting vibration on the surface of the object based on the ultrasonic waves by a laser interferometer or a laser doppler vibrometer to detect presence or absence of the resonance of the ultrasonic waves.

3. The defect detection method according to claim 2, wherein the step of detecting presence or absence of the resonance includes irradiating the object with a laser beam of the laser interferometer in a same position as irradiated with the pulsed laser beam.

4. The defect detection method according to claim 1, wherein presence or absence of the internal defect is detected on the object in the process of 3D printing by additive manufacturing.

5. The defect detection method according to claim 1, wherein the internal defect in a surface layer within 200 μm from the surface of the object is detected.

6. The defect detection method according to claim 1, comprising a step of, if the internal defect is detected on the object in the process of 3D printing by additive manufacturing, melting a next layer and a layer immediately below the next layer so as to repair the internal defect when forming the next layer immediately above the internal defect.

7. The defect detection method according to claim 1, comprising:
a step of acquiring a detection signal of vibration on the surface of the object;
a step of comparing the detection signal with a reference signal indicating vibration on the surface of the object obtained when the pulsed laser beam is applied in a position where it is presumed that there is no internal defect; and
a step of detecting presence or absence of the internal defect according to a comparison result of the comparison step.

8. The defect detection method according to claim 7, comprising a step of identifying a depth position of the internal defect on the basis of the repetition frequency corresponding to the maximal value.

9. The defect detection method according to claim 1, comprising:
a step of acquiring a detection signal of vibration on the surface of the object while sweeping the repetition frequency of the pulsed laser beam; and
a step of detecting presence or absence of the internal defect on the basis of whether an amplitude indicated by the detection signal has a maximal value depending on a change in the repetition frequency.

10. The defect detection method according to claim 1, comprising a step of setting the repetition frequency of the pulsed laser beam within a frequency range having a wavelength equal to or less than a half wavelength corresponding to a depth range to be detected in the object.

11. The defect detection method according to claim 1, comprising:
a step of irradiating the object with an energy beam for 3D printing; and
a step of detecting presence or absence of the internal defect on the object in a position not being irradiated with the energy beam.

12. The defect detection method according to claim 1, comprising a step of detecting presence or absence of the internal defect on the object each time a plurality of layers corresponding to a depth range to be detected in the object are stacked when 3D printing is performed by additive manufacturing.

13. The defect detection method according to claim 1, wherein the step of generating the ultrasonic waves is performed when vibration of the object is equal to or less than a reference value.

14. The defect detection method according to claim 1, wherein the internal defect is detected by scanning the pulsed laser beam so as to follow a trajectory of an energy beam when 3D printing is performed by additive manufacturing.

15. A defect detection device, comprising:
a pulsed laser irradiation device configured to irradiate an object with a pulsed laser beam to continuously generate ultrasonic waves in the object; and
a detection device configured to detect vibration on a surface of the object based on the ultrasonic waves, detect presence or absence of resonance of the ultrasonic waves, and detect presence or absence of an internal defect of the object on the basis of presence or absence of the resonance of the ultrasonic waves occurring between the surface of the object and the internal defect,
wherein the defect detection device is configured to, if the internal defect is detected, identify a depth position of the internal defect on the basis of a repetition frequency of the pulsed laser beam when the resonance occurs, and further comprising setting the repetition frequency of the pulsed laser beam so as to correspond to a frequency with a half wavelength equal to a depth from the surface of the object to the internal defect to be detected.

16. An additive manufacturing device, comprising:
a beam irradiation device for 3D printing an object; and
the defect detection device according to claim 15.

* * * * *